D. A. CLARK, DEC'D.
S. E. CLARK, ADMINISTRATRIX.
NUT LOCK.
APPLICATION FILED AUG. 1, 1910.
988,928.
Patented Apr. 4, 1911.
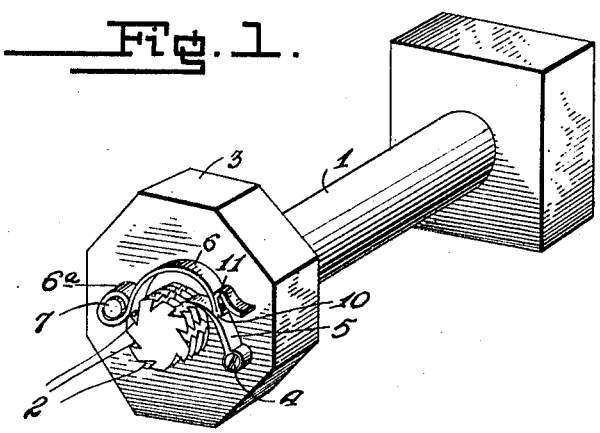
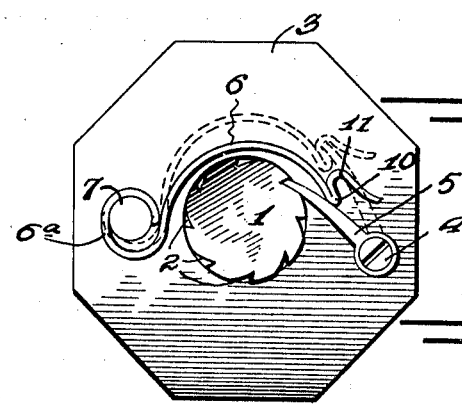
Inventor
Sarah E. Clark,
Administratrix of the estate of
David A. Clark

UNITED STATES PATENT OFFICE.

DAVID A. CLARK, DECEASED, LATE OF ALTHEIMER, ARKANSAS; SARAH E. CLARK, ADMINISTRATRIX, ASSIGNOR OF ONE-HALF TO IDA S. LANGFORD, OF PINE BLUFF, ARKANSAS.

NUT-LOCK.

988,928.  Specification of Letters Patent.  Patented Apr. 4, 1911.

Application filed August 1, 1910.  Serial No. 574,837.

*To all whom it may concern:*

Be it known that DAVID A. CLARK, late a citizen of the United States, formerly residing at Altheimer, in the county of Jefferson and State of Arkansas, did invent certain new and useful Improvements in Nut-Locks, of which the following is a specification, reference being had therein to the accompanying drawing.

This invention relates to means for locking nuts and bolts together, and the principal object of the same is to provide a simple and efficient device by means of which a nut and bolt can be normally held in locked relation, means also being provided whereby the device can be held in an unlocked position so that the nut and bolt can be readily separated.

In carrying out the objects of the invention generally stated above it will be understood, of course, that the essential features thereof are necessarily susceptible of changes in details and structural arrangements, one preferred and practical embodiment of which is shown in the accompanying drawings, wherein :—

Figure 1 is a perspective view of the improved nut and bolt lock. Fig. 2 is an end view thereof. Fig. 3 is a detail perspective view of a spring forming a part of this invention. Fig. 4 is a similar view of a lug for attaching the spring to a nut. Fig. 5 is a similar view of a pawl and pivot bolt used in connection with this invention.

Referring to the accompanying drawings by numerals, 1 designates a bolt the threaded portion of which is provided with regularly spaced longitudinally extending grooves 2. The nut 3 has its top provided with a detachable pivot bolt 4 which carries a pawl 5 for engagement with the grooves 2 of the bolt 1 to prevent the nut being removed from the bolt. The pawl 5 is normally held in engagement with one of the grooves 2 of the bolt 1 to prevent reverse movement of the nut by means of a spring 6 one end portion of which loosely surrounds a lug 7 and has a hook-shaped end 8 that enters recess 9 in said lug to prevent the spring slipping. The opposite end portion of the spring 6 is crimped to provide a lip 10 that bears on the pawl 5 to hold said pawl engaged with the bolt 1, and said end portion is also bent to provide a socket 11 which receives the free end of the pawl when disengaged from the bolt 1 to hold the same unlocked, as shown by dotted lines in Fig. 2. The lug 7, as is shown more clearly in Fig. 4, is provided with a threaded shank 12 by means of which the said lug is held in rigid but detachable engagement with the top of the nut 3.

It will be seen from the foregoing that this invention provides simple means for holding the pawl engaged with the bolt or disengaged therefrom, and also that the spring and the pawl are detachably connected to the nut so that the same can be readily removed when necessary or desirable.

As is shown more clearly in Fig. 2 of the drawing, the end $6^a$ of the spring which surrounds the lug 7, overlaps and bears upon the hook-shaped end 8 and is constantly exerting a pressure thereon so that said end 8 is prevented from becoming accidentally displaced from recess 9, and when the spring is forced away from bolt 1 to hold the pawl 5 disengaged from said bolt, the said spring automatically tightens about lug 7 as is indicated by dotted lines in Fig. 2.

What is claimed as the invention is:—

A nut lock comprising a bolt provided with grooves, a nut therefor, a pawl carried by said nut for engaging said grooves, a lug carried by said nut, and a spring fastened to and coiled about said lug for normally holding the pawl in engagement with the bolt said spring having its free end crimped to provide a socket for the reception of the free end of the pawl to hold said pawl disengaged from said bolt.

In testimony whereof I hereunto affix my signature in presence of two witnesses.

SARAH E. CLARK,

*Administratrix of the estate of David A. Clark, deceased.*

Attest:
 J. W. CRAWFORD,
 LUCILLE JOHNSON.